(12) United States Patent
Shinba

(10) Patent No.: US 9,924,065 B2
(45) Date of Patent: Mar. 20, 2018

(54) LIGHTING CONTROL CIRCUIT AND IMAGE FORMING APPARATUS

(71) Applicant: KYOCERA Document Solutions Inc., Osaka-shi, Osaka (JP)

(72) Inventor: Minoru Shinba, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 32 days.

(21) Appl. No.: 14/915,291

(22) PCT Filed: Aug. 26, 2014

(86) PCT No.: PCT/JP2014/072221
§ 371 (c)(1),
(2) Date: Feb. 29, 2016

(87) PCT Pub. No.: WO2015/029962
PCT Pub. Date: Mar. 5, 2015

(65) Prior Publication Data
US 2016/0219180 A1   Jul. 28, 2016

(30) Foreign Application Priority Data

Aug. 30, 2013 (JP) .............................. 2013-180669

(51) Int. Cl.
- *H04N 1/04* (2006.01)
- *H04N 1/028* (2006.01)
- *G09G 3/32* (2016.01)
- *H04N 1/00* (2006.01)
- *G09G 3/30* (2006.01)

(52) U.S. Cl.
CPC ............ *H04N 1/0288* (2013.01); *G09G 3/30* (2013.01); *G09G 3/32* (2013.01);
(Continued)

(58) Field of Classification Search
CPC ............ H04N 1/0288; H04N 1/00411; H04N 1/00496; H04N 2201/0094; G09G 3/30;
(Continued)

(56) References Cited

U.S. PATENT DOCUMENTS 5,483,460 A    1/1996  Kokura et al.
7,808,683 B2 * 10/2010  Muraki .................... B41J 3/46
                                               358/296
(Continued)

FOREIGN PATENT DOCUMENTS

JP          6-214628       8/1994
JP          07-092932      4/1995
(Continued)

OTHER PUBLICATIONS

International Search Report.

*Primary Examiner* — Cheukfan Lee
(74) *Attorney, Agent, or Firm* — Gerald E. Hespos; Michael J. Porco; Matthew T. Hespos

(57) ABSTRACT

A lighting control circuit (1) controls lighting and extinguishing a plurality of light-emitting elements (D11 to D19, D21 to D29, and D31 to D39). The lighting control circuit (1) has: a first scanning circuit (10) that sequentially scans the light-emitting elements by a predetermined first unit number at a time; a second scanning circuit (20) that sequentially scans the light-emitting elements being scanned by the first scanning circuit (10) by a second unit number at a time, which is lower than the first unit number; and a control circuit (30) that controls lighting and extinguishing the individual light-emitting elements being scanned by the first and second scanning circuits (10, 20).

7 Claims, 5 Drawing Sheets

(52) U.S. Cl.
CPC ..... *H04N 1/00411* (2013.01); *H04N 1/00496* (2013.01); *G09G 2300/06* (2013.01); *G09G 2310/0272* (2013.01); *H04N 2201/0094* (2013.01)

(58) Field of Classification Search
CPC ............. G09G 3/32; G09G 2310/0272; G03G 2300/06
USPC ....... 358/475, 509, 486, 474, 471, 400, 401, 358/500, 501, 505
See application file for complete search history.

(56) References Cited

U.S. PATENT DOCUMENTS

| | | |
|---|---|---|
| 2004/0032637 A1 | 2/2004 | Imamura |
| 2006/0246619 A1 | 11/2006 | Imamura |
| 2010/0020061 A1 | 1/2010 | Kanauchi et al. |
| 2015/0302792 A1* | 10/2015 | Lu ........................... G09G 3/32 315/294 |

FOREIGN PATENT DOCUMENTS

| | | |
|---|---|---|
| JP | 07-104689 | 4/1995 |
| JP | 07-199861 | 8/1995 |
| JP | 11-231821 | 8/1999 |
| JP | 2002-328652 | 11/2002 |
| JP | 2005-3698 | 1/2005 |
| JP | 2006-301271 | 11/2006 |
| JP | 2009-103614 | 5/2009 |
| WO | 2008050411 | 10/2006 |
| WO | 2008050411 | 5/2008 |

* cited by examiner

LIGHTING CONTROL CIRCUIT AND IMAGE FORMING APPARATUS

TECHNICAL FIELD

The present invention relates to a lighting control circuit and an image forming apparatus.

BACKGROUND ART

Lighting of light-emitting elements such as LEDs (Light Emitting Diodes) is usually controlled using a dynamic lighting system. The dynamic lighting system is a lighting system that sequentially scans a plurality of light-emitting elements by a predetermined number at a time and controls individually lighting and extinguishing the predetermined number of scanned light-emitting elements within the scanning period. For instance, when the total number of light-emitting elements is nine, these nine light-emitting elements are sequentially scanned three at a time, and the lighting and extinguishing the three scanned light-emitting elements within the scanning period are controlled individually.

A lighting control circuit that controls the lighting of light-emitting elements by means of such a dynamic lighting system has the advantage of being able to reduce the number of signal lines used for controlling the lighting of light-emitting elements. Due to this advantage, the lighting control circuit is provided in various types of equipment, apparatuses, and other objects. For example, an image forming apparatus such as a copy machine, a printer, a facsimile machine, or a multifunction machine equipped with the functions of these devices is provided with the foregoing lighting control circuit for controlling the lighting of the LEDs provided in an operation unit operated by a user. Note that the following PTLs 1 to 7 each disclose a conventional lighting control circuit that controls the lighting of an LED by means of the dynamic lighting system.

As described above, the lighting control circuit that controls the lighting by means of the dynamic lighting system has the advantage of being able to reduce the number of signal lines used for controlling the lighting of each light-emitting element. However, due to the tendency that the number of signal lines required for controlling the lighting increases as the number of light-emitting elements increases, when there are too many light-emitting elements (e.g., approximately several tens or more), even the lighting control circuit that controls the lighting by means of the dynamic lighting system ends up having too many signal lines.

Now, let it be assumed that the number of scanning signals (scanning signal lines) used for scanning light-emitting elements in the foregoing lighting control circuit that controls the lighting by means of the dynamic lighting system is n1, and that the number of lighting control signals (the number of lighting control signal lines) for controlling lighting and extinguishing the individual light-emitting elements within the scanning periods is n2. The maximum number of light-emitting elements whose lighting can be controlled by this lighting control circuit is defined by the product of these numbers (n1×n2). The number of signal lines used for controlling the lighting of these (n1×n2) light-emitting elements is the sum of these numbers, (n1+n2).

For example, in a case where the number of scanning signal lines is three (n1=3) and the number of lighting control signal lines is three (n2=3), the lighting of a maximum of nine light-emitting elements can be controlled. Specifically, a total of six signal lines are required in order to control the lighting of the nine light-emitting elements. However, in a case where the number of scanning signal lines is three (n1=3) and the number of lighting control signal lines is nine (n2=9), the lighting of a maximum of twenty-seven light-emitting elements can be controlled. Specifically, a total of twelve signal lines are required in order to control the lighting of the twenty-seven light-emitting elements, resulting in an increase of the total number of signal lines.

SUMMARY OF INVENTION

An object of the present invention is to provide a lighting control circuit capable of reducing the number of signal lines used for controlling the lighting of light-emitting elements, and an image-forming device provided with this circuit.

A lighting control circuit according to one aspect of the present invention is a lighting control circuit for controlling lighting and extinguishing a plurality of light-emitting elements, the lighting control circuit having: a first scanning circuit that sequentially scans the light-emitting elements by a predetermined first unit number at a time; a second scanning circuit that sequentially scans the light-emitting elements being scanned by the first scanning circuit by a second unit number at a time, which is lower than the first unit number; and a control circuit that controls lighting and extinguishing the individual light-emitting elements being scanned by the first and second scanning circuits.

An image forming apparatus according to another aspect of the present invention is an image forming apparatus for forming an image onto a recording medium, the image forming apparatus having: a plurality of light-emitting elements provided for displaying a device state; and the lighting control circuit that controls lighting and extinguishing the light-emitting elements.

According to the present invention, the first scanning circuit sequentially scans the plurality of light-emitting elements by a predetermined first unit number at a time. The light-emitting elements that are scanned by the first scanning circuit are scanned sequentially by the second scanning circuit by a second unit number at a time, which is lower than the first unit number. The lighting and extinguishing the light-emitting elements being scanned by the first and second scanning circuits are controlled individually by the control circuit. Therefore, the number of signal lines used for controlling the lighting of the light-emitting elements can further be reduced.

The objects, features and advantages of the present invention will become more apparent in the following detail description and the accompanying drawings.

DESCRIPTION OF EMBODIMENTS

A lighting control circuit and an image forming apparatus according to an embodiment of the present invention are described hereinafter in detail with reference to the drawings.

[Lighting Control Circuit]

Figure 1:
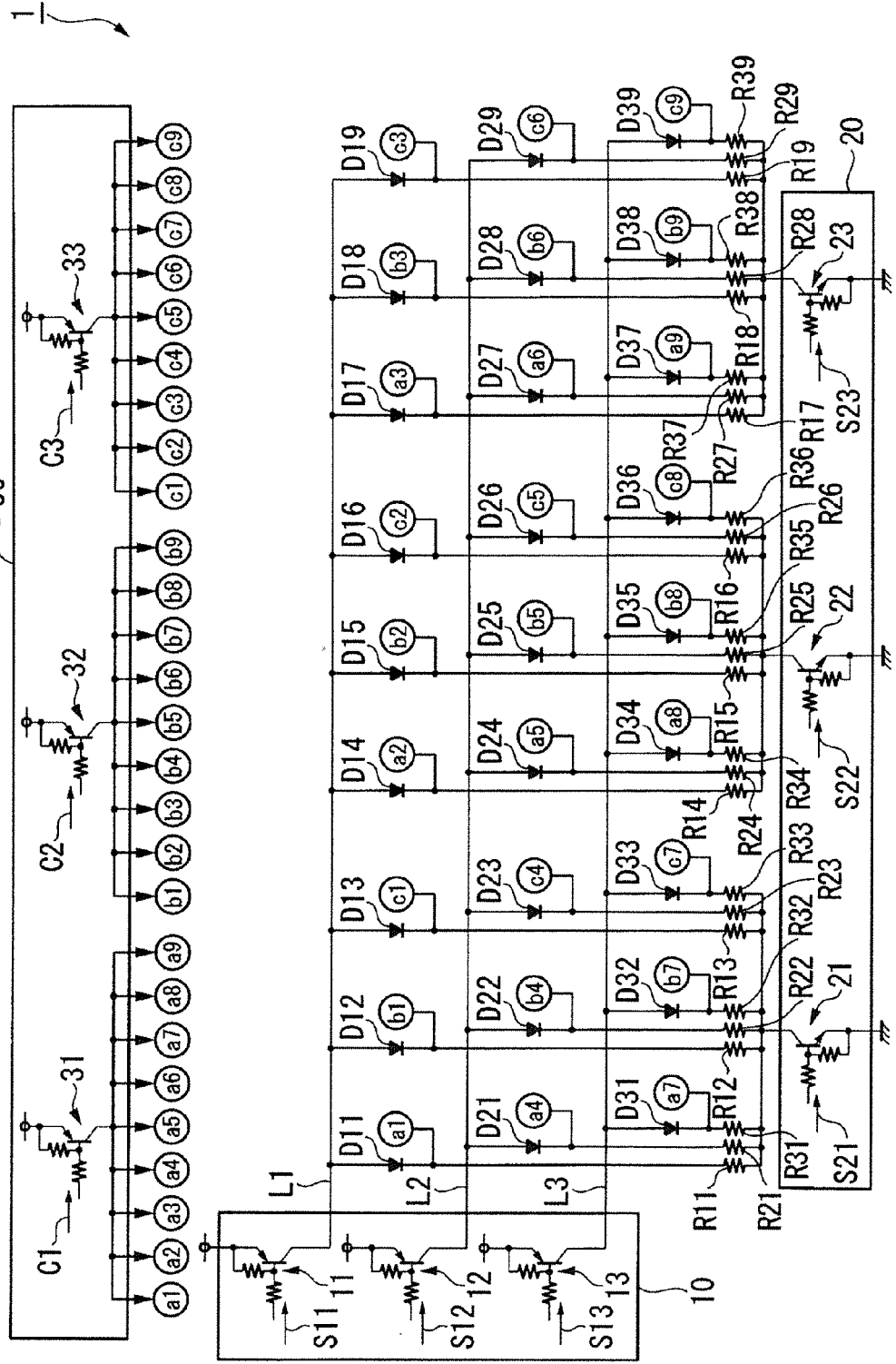
FIG. 1 is a circuit diagram showing a configuration of principal portions of a lighting control circuit according to an embodiment of the present invention.

FIG. 1 is a circuit diagram showing a configuration of principal portions of a lighting control circuit 1 according to an embodiment of the present invention. The lighting control circuit 1 has a scanning circuit 10 (the first scanning circuit), a scanning circuit 20 (the second scanning circuit), and a control circuit 30, and controls lighting and extinguishing a plurality of light-emitting elements. For the purpose of enabling a better understanding of the present invention, the present embodiment describes an example in which the lighting control circuit 1 controls lighting and extinguishing a total of twenty-seven light-emitting elements (light-emitting elements D11 to D19, D21 to D29, and D31 to D39).

The light-emitting elements D11 to D19, D21 to D29, and D31 to D39 are, for example, LEDs (Light Emitting Diodes). The anode electrodes (positive electrodes) of the light-emitting elements D11 to D19 are respectively connected to a scanning line L1. The anode electrodes of the light-emitting elements D21 to D29 are respectively connected to a scanning line L2. The anode electrodes of the light-emitting elements D31 to D39 are respectively connected to a scanning line L3. The cathode electrodes (negative electrodes) of the light-emitting elements D11 to D19, D21 to D29, and D31 to D39 are connected to resistors R11 to R19, R21 to R29, and R31 to R39, respectively.

The scanning circuit 10 sequentially scans the light-emitting elements D11 to D19, D21 to D29, and D31 to D39 by a predetermined number (the first unit number) at a time, based on scanning signals S11 to S13 that are input from the outside. Specifically, the scanning circuit 10 sequentially scans by a unit of nine light-emitting elements (the light-emitting elements D11 to D19, the light-emitting elements D21 to D29, the light-emitting elements D31 to D39) at a time, the light-emitting elements being connected to the scanning lines L1 to L3, respectively.

The scanning circuit 10 has a plurality of switching circuits 11 to 13 (the first switches) that perform the scanning described above by connecting the scanning lines L1 to L3 sequentially to a power source. Of the switching circuit 11, a base terminal receives input of the scanning signal S11, an emitter terminal is connected to the power source, and a collector terminal has a PNP transistor connected to the scanning line L1. The switching circuit 11 connects the scanning line L1 to the power source based on the scanning signal S11. Of the switching circuit 12, a base terminal receives input of the scanning signal S12, an emitter terminal is connected to the power source, and a collector terminal has a PNP transistor connected to the scanning line L2. The switching circuit 12 connects the scanning line L2 to the power source based on the scanning signal S12.

Similarly, of the switching circuit 13, a base terminal receives input of the scanning signal S13, an emitter terminal is connected to the power source, and a collector terminal has a PNP transistor connected to the scanning line L3. The switching circuit 13 connects the scanning line L3 to the power source based on the scanning signal S13. Therefore, the scanning lines L1 to L3 are connected sequentially to the power source as a result of inputting the scanning signals S11 to S13, the signal levels of which sequentially become "L (low)" level at mutually different times.

Based on scanning signals S21 to S23 that are input from the outside, the scanning circuit 20 sequentially scans the light-emitting elements being scanned by the scanning circuit 10 by a certain number (the second unit number) at a time, which is lower than the number of light-emitting elements scanned by the scanning circuit 10. Specifically, the scanning circuit 20 sequentially scans the nine light-emitting elements being scanned by the scanning circuit 10, three at a time. For instance, when the scanning line L1 is being scanned, the scanning circuit 20 sequentially scans three light-emitting elements D11 to D13, three light-emitting elements D14 to D16, and three light-emitting elements D17 to D19.

The scanning circuit 20 not only sequentially scans the light-emitting elements being scanned by the scanning circuit 10, three at a time as described above, but also similarly scans the light-emitting elements that are not scanned by the scanning circuit 10. For example, when the scanning line L1 is being scanned by the scanning circuit 10, the scanning circuit 20 also scans the light-emitting elements D21 to D23 and D31 to D33 simultaneously that are connected to the scanning lines L2 and L3, in addition to the three light-emitting elements D11 to D13 connected to the scanning line L1.

The scanning circuit 20 also scans the light-emitting elements D24 to D26 and D34 to D36 simultaneously that are connected to the scanning lines L2 and L3, in addition to the three light-emitting elements D14 to D16 connected to the scanning line L1. Similarly, the scanning circuit 20 scans the light-emitting elements D27 to D29 and D37 to D39 simultaneously that are connected to the scanning lines L2 and L3, in addition to the three light-emitting elements D17 to D19 connected to the scanning line L1.

In other words, the scanning circuit 20 scans a total of nine light-emitting elements simultaneously, i.e., the three light-emitting elements D11 to D13 connected to the scanning line L1, the three light-emitting elements D21 to D23 connected to the scanning line L2, and the three light-emitting elements D31 to D33 connected to the scanning line L3. The scanning circuit 20 also scans a total of nine light-emitting elements simultaneously, i.e., the three light-emitting elements D14 to D16 connected to the scanning line L1, the three light-emitting elements D24 to D26 connected to the scanning line L2, and the three light-emitting elements D34 to D36 connected to the scanning line L3. Similarly, the scanning circuit 20 scans a total of nine light-emitting elements simultaneously, i.e., the three light-emitting elements D17 to D19 connected to the scanning line L1, the three light-emitting elements D27 to D29 connected to the scanning line L2, and the three light-emitting elements D37 to D39 connected to the scanning line L3.

The scanning circuit 20 has, for each of the plurality of scanning lines, a plurality of switching circuits 21 to 23 (the second switches) for performing the scanning described above by sequentially connecting the light-emitting element to be scanned to a ground. Of the switching circuit 21, a base terminal receives input of the scanning signal S21, an emitter terminal is connected to the ground, and a collector terminal has an NPN transistor connected to the resistors R11 to R13, R21 to R23, and R31 to R33. The switching circuit 21 connects the resistors R11 to R13, R21 to R23, and R31 to R33 (the cathode electrodes of the light-emitting elements D11 to D13, D21 to D23, and D31 to D33) to the ground based on the scanning signal S21.

Of the switching circuit 22, a base terminal receives input of the scanning signal S22, an emitter terminal is connected to the ground, and a collector terminal has an NPN transistor connected to the resistors R14 to R16, R24 to R26, and R34 to R36. The switching circuit 22 connects the resistors R14 to R16, R24 to R26, and R34 to R36 (the cathode electrodes of the light-emitting elements D14 to D16, D24 to D26, and D34 to D36) to the ground based on the scanning signal S22.

Similarly, of the switching circuit 23, a base terminal receives input of the scanning signal S23, an emitter terminal is connected to the ground, and a collector terminal has an NPN transistor connected to the resistors R17 to R19, R27 to R29, and R37 to R39. The switching circuit 23 connects the resistors R17 to R19, R27 to R29, and R37 to R39 (the cathode electrodes of the light-emitting elements D17 to D19, D27 to D29, and D37 to D39) to the ground based on the scanning signal S23.

Therefore, the cathode electrodes of the light-emitting elements D11 to D13, D21 to D23, and D31 to D33, the cathode electrodes of the light-emitting elements D14 to D16, D24 to D26, and D34 to D36, and the cathode electrodes of the light-emitting elements D17 to D19, D27 to D29, and D37 to D39 are sequentially connected to the ground as a result of inputting the scanning signals S21 to S23, the signal levels of which sequentially become "H (high)" level at mutually different times.

The time during which the light-emitting elements are scanned by the scanning circuit 20 (nine light-emitting elements at a time) is obtained by dividing the time during which the light-emitting elements are scanned by the scanning circuit 10 (nine light-emitting elements at a time) by the number of scanning lines L1 to L3. Specifically, the scanning time of the scanning circuit 20 is set to be ⅓ of the scanning time of the scanning circuit 10. In other words, the time during which the light-emitting elements are scanned by the scanning circuit 10 (nine light-emitting elements at a time) is obtained by multiplying the time during which the light-emitting elements are scanned by the scanning circuit 20 (nine light-emitting elements at a time) by the number of scanning lines L1 to L3. In other words, the scanning time of the scanning circuit 10 is set to be three times more than the scanning time of the scanning circuit 20.

The control circuit 30 controls lighting and extinguishing the individual light-emitting elements being scanned by the scanning circuit 10 and the scanning circuit 20, based on lighting control signals C1 to C3 that are input from the outside. As described above, the scanning circuit 10 scans every nine light-emitting elements connected to each of the scanning lines L1 to L3, while the scanning circuit 20 sequentially scans the nine light-emitting elements being scanned by the scanning circuit 10, three at a time. Therefore, the number of light-emitting elements that are scanned at once by both the scanning circuit 10 and the scanning circuit 20 is three. Thus, the control circuit 30 controls individually lighting and extinguishing every three light-emitting elements scanned by both the scanning circuit 10 and the scanning circuit 20.

Specifically, the control circuit 30 sequentially controls lighting and extinguishing the three light-emitting elements D11 to D13, the three light-emitting elements D14 to D16, the three light-emitting elements D17 to D19, the three light-emitting elements D21 to D23, the three light-emitting elements D24 to D26, the three light-emitting elements D27 to D29, the three light-emitting elements D31 to D33, the three light-emitting elements D34 to D36, and the three light-emitting elements D37 to D39 individually. In other words, which one of the three light-emitting elements is to be turned on and which one is to be turned off are controlled.

The control circuit 30 has a plurality of switching circuits 31 to 33 (the third switches) that set individually the potentials of the cathodes of the light-emitting elements being scanned by the scanning circuit 10 and the scanning circuit 20. Of the switching circuit 31, a base terminal receives input of the control signal C1, an emitter terminal is connected to the power source, and a collector terminal has a PNP transistor connected to the cathode electrodes of nine light-emitting elements (the light-emitting elements D11, D14, D17, D21, D24, D27, D31, D34, and D37). Based on the control signal C1, the switching circuit 31 sets the potentials of the cathode electrodes of the light-emitting elements D11, D14, D17, D21, D24, D27, D31, D34, and D37 at the potential of the power source or the potential of the ground.

Of the switching circuit 32, a base terminal receives input of the control signal C2, an emitter terminal is connected to the power source, and a collector terminal has a PNP transistor connected to the cathode electrodes of nine light-emitting elements (the light-emitting elements D12, D15, D18, D22, D25, D28, D32, D35, and D38). Based on the control signal C2, the switching circuit 32 sets the potentials of the cathode electrodes of the light-emitting elements D12, D15, D18, D22, D25, D28, D32, D35, and D38 at the potential of the power source or the potential of the ground.

Similarly, in the switching circuit 33, a base terminal receives input of the control signal C3, an emitter terminal is connected to the power source, and a collector terminal has a PNP transistor connected to the cathode electrodes of nine light-emitting elements (the light-emitting elements D13, D16, D19, D23, D26, D29, D33, D36, and D39). Based on the control signal C3, the switching circuit 33 sets the potentials of the cathode electrodes of the light-emitting elements D13, D16, D19, D23, D26, D29, D33, D36, and D39 at the potential of the power source or the potential of the ground.

The time during which the lighting and extinction are controlled by the control circuit 30 is set to be equal to the time during which the light-emitting elements (every nine light-emitting elements) are scanned by the scanning circuit 20. As described above, the scanning time of the scanning circuit 20 is set to be ⅓ of the scanning time of the scanning circuit 10. Therefore, the lighting and extinction controlled by the control circuit 30 are executed in terms of a time equivalent to ⅓ of the scanning time of the scanning circuit 10.

Figure 2:
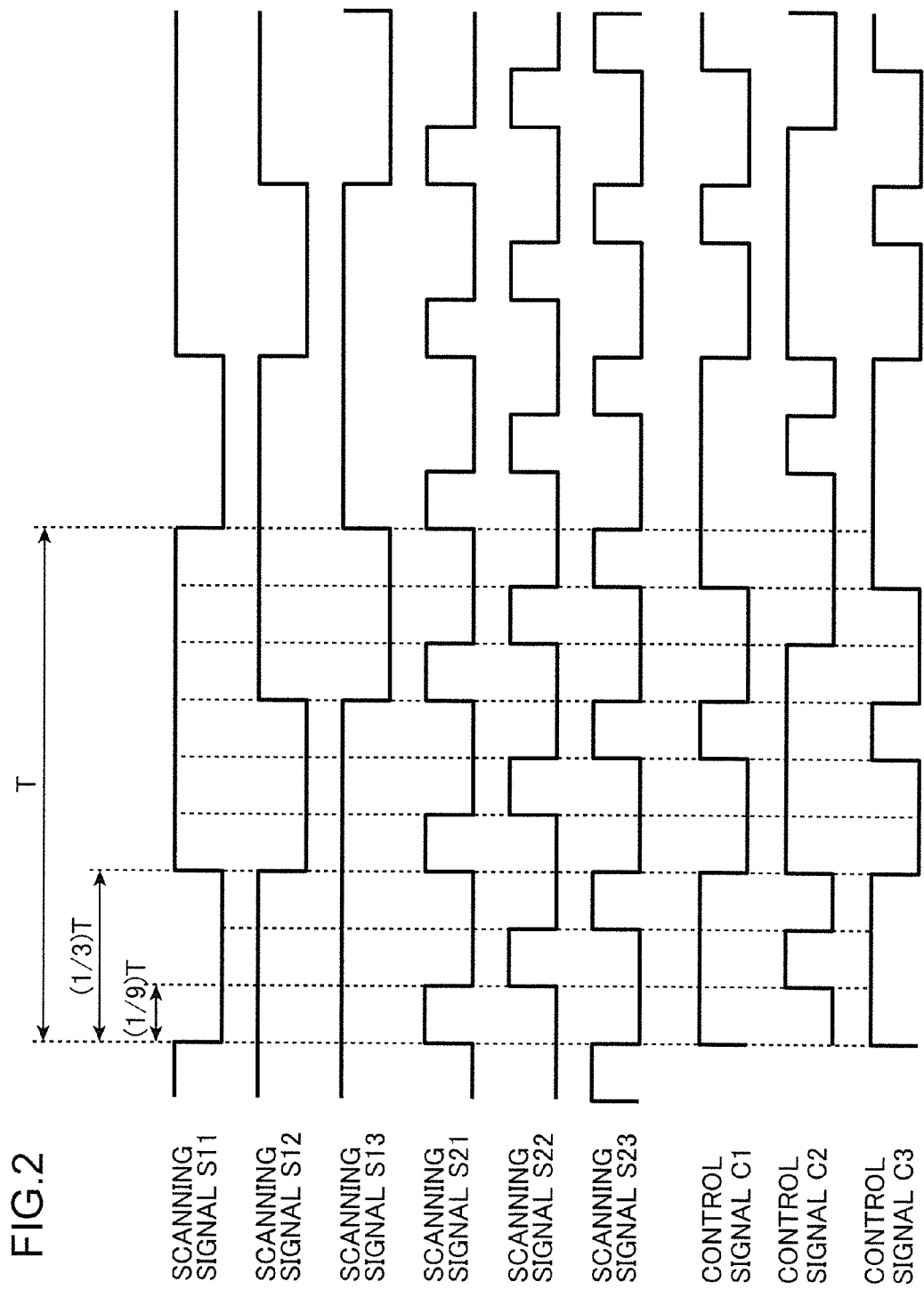
FIG. 2 is a timing chart for explaining the operations of the lighting control circuit.

Next, the operations of the lighting control circuit 1 according to the foregoing configurations are described in detail. FIG. 2 is a timing chart for explaining the operations of the lighting control circuit 1. The scanning circuit 10 of the lighting control circuit 1 receives input of the scanning signals S11 to S13, the cycles of which are T, pulse widths (the time during which the "L" level is kept) of which are (⅓)T, and the phases of which are different by (⅓)T. The scanning circuit 20 of the lighting control circuit 1, on the other hand, receive input of the scanning signals S21 to S23, the cycles of which are (⅓)T, the pulse widths (the time during which the "H" level is kept) of which are (⅑)T, and the phases of which are different by (⅑)T.

Once the scanning signals S11 to S13 are input to the scanning circuit 10, the PNP transistors provided in the switching circuits 11 to 13 are turned ON sequentially and the scanning lines L1 to L3 are sequentially scanned every (⅓)T. Specifically, the following operation is repeated: the scanning line L1 is scanned in which the anode electrodes of the nine light-emitting elements D11 to D19 are connected to the power source for the time period of (⅓)T, the scanning line L2 is scanned in which the anode electrodes of the nine light-emitting elements D21 to D29 are connected to the power source for the time period of (⅓)T, and the scanning line L3 is scanned in which the anode electrodes of the nine light-emitting elements D31 to D39 are connected to the power source for the time period of (⅓)T.

Once the scanning signals S21 to S23 are input to the scanning circuit 20, the NPN transistors provided in the switching circuits 21 to 23 are turned ON sequentially, and each group of nine light-emitting elements are sequentially scanned every (⅑)T. Specifically, the following operation is repeated: the light-emitting elements D11 to D13, D21 to D23, and D31 to D33 are scanned in which the cathode electrodes thereof are connected to the ground for the time period of (⅑)T, the light-emitting elements D14 to D16, D24 to D26, and D34 to D36 are scanned in which the cathode electrodes thereof are connected to the ground for the time period of (⅑)T, and the light-emitting elements D17 to D19, D27 to D29, and D37 to D39 are scanned in which the cathode electrodes thereof are connected to the ground for the time period of (⅑)T. Precisely, the cathode electrode of each of the light-emitting elements is connected to the ground by the corresponding resistor.

When the control signals C1 to C3 are input to the control circuit 30 in synchronization with the scanning signals S11 to S13 and the scanning signals S21 to S23, the PNP transistors provided in the switching circuits 31 to 33 are turned ON or OFF in response to the control signals C1 to C3. Consequently, the control circuit 30 controls lighting and extinguishing every three light-emitting elements individually that are being scanned by the scanning circuit 10 and the scanning circuit 20.

For instance, the case shown in FIG. 2 in which the level of the scanning signal S11 is "L" and the level of the scanning signal S21 is "H" (in which the light-emitting elements D11 to D13 are scanned by the scanning circuit 10 and the scanning circuit 20) is considered. In this case, when the levels of the control signals C1 and C3 are "H" and the level of the control signal C2 is "L," the PNP transistors provided in the switching circuits 31 and 33 are turned OFF, and the PNP transistor provided in the switching circuits 32 is turned ON. As a result, the potentials of the cathode electrodes of the light-emitting elements D11 and D13 become equivalent to the ground potential, and the potential of the cathode electrode of the light-emitting element D12 becomes equivalent to the potential of the power source, whereby the light-emitting elements D11 and D13 are lighted, while the light-emitting element D12 is not (is extinct). The lighting and extinguishing the light-emitting elements are controlled in this manner.

In the lighting control circuit 1 of the present embodiment, the number of scanning signals S11 to S13 (scanning signal lines) that are input to the scanning circuit 10, the number of scanning signals S21 to S23 (scanning signal lines) that are input to the scanning circuit 20, and the number of control signals C1 to C3 (control signals lines) that are input to the control circuit 30 are all "3." For this reason, the lighting control circuit 1 is capable of controlling the lighting of the twenty-seven light-emitting elements with a total of nine signal lines. Therefore, the number of signal lines can be made lower as compared to the conventional lighting control circuits (the lighting control circuits that control the lighting by means of the dynamic lighting system).

Let it be assumed that the number of scanning signals (scanning signal lines) that are input to the scanning circuit 10 is N1, that the number of scanning signals (scanning signal lines) that are input to the scanning circuit 20 is N2, and that the number of control signals (control signal lines) that are input to the control circuit 30 is N3. The lighting control circuit according to the present invention is capable of controlling the lighting of the maximum of (N1×N2×N3) light-emitting elements with (N1+N2+N3) signal lines.

As described above, the lighting control circuit 1 of the present embodiment has the scanning circuit 10 that sequentially scans the light-emitting elements D11 to D19, D21 to D29, and D31 to D39 connected to the scanning lines L1 to L3, the scanning circuit 20 that sequentially scans the light-emitting elements being scanned by the scanning circuit 10 by a predetermined number at a time, and the control circuit 30 that controls individually lighting and extinguishing the light-emitting elements being scanned by the scanning circuit 10 and the scanning circuit 20. Therefore, the number of signal lines used for controlling the lighting of the light-emitting elements can further be reduced.

[Image-Forming Device]

Figure 3:
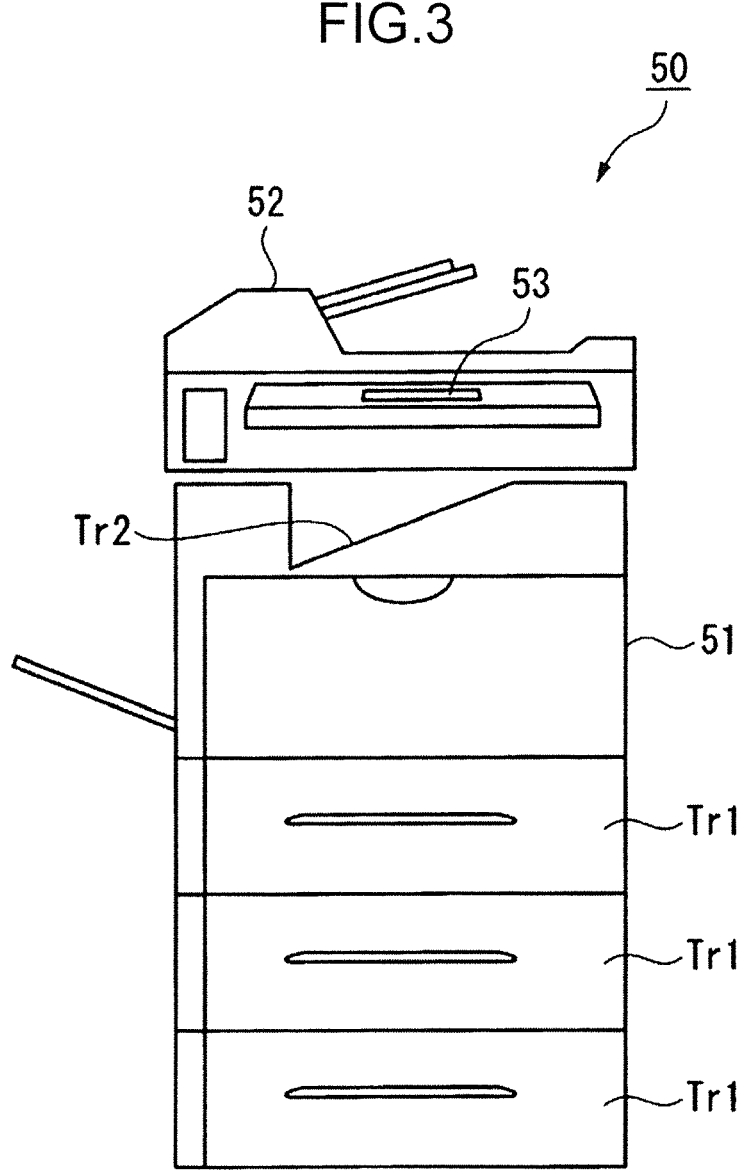
FIG. 3 is a front view showing an outline of the appearance of a multifunction machine illustrated as an image forming apparatus according to an embodiment of the present invention.
Figure 4:
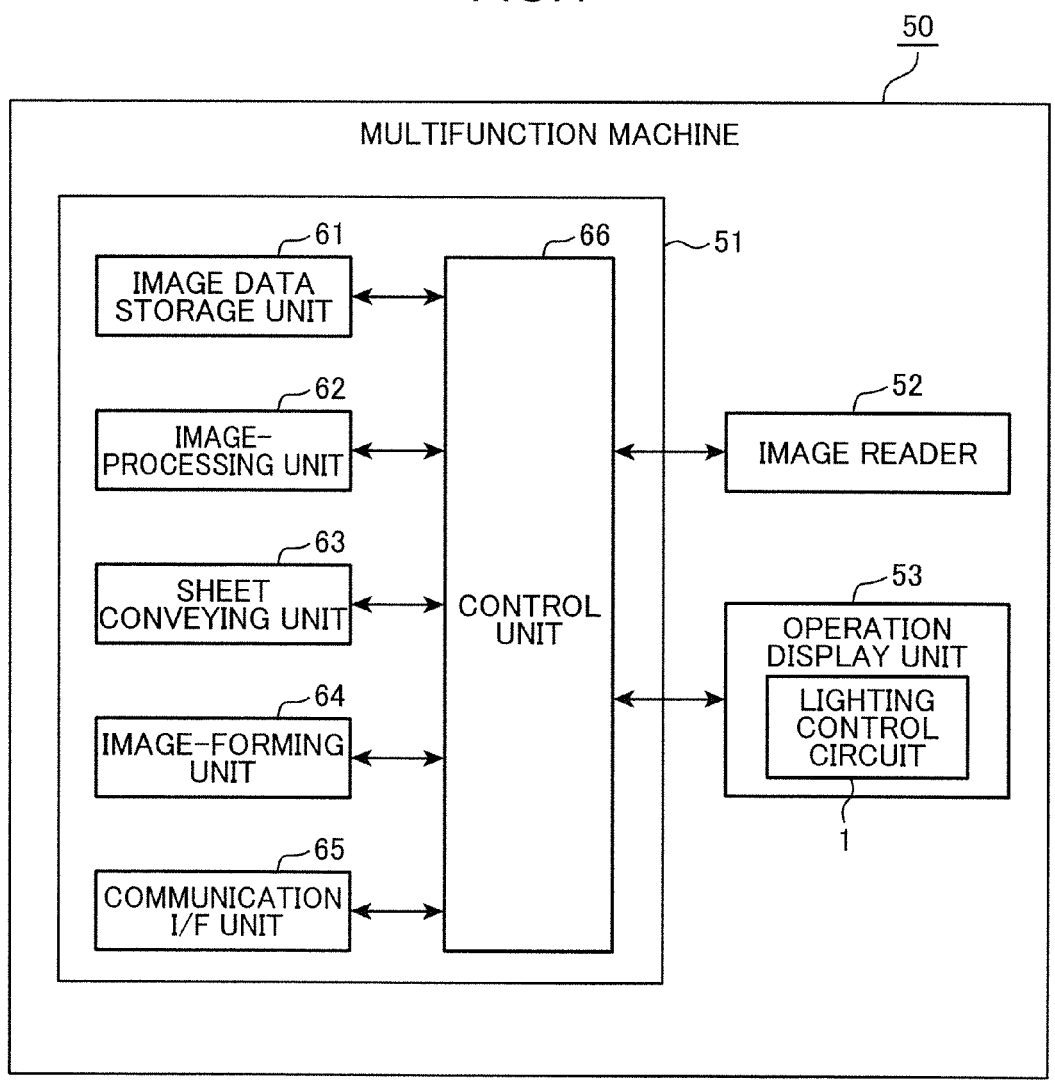
FIG. 4 is a block diagram showing an electrical configuration of the multifunction machine.

FIG. 3 is a front view showing an outline of the appearance of a multifunction machine 50 illustrated as an image forming apparatus according to an embodiment of the present invention. FIG. 4 is a block diagram showing an electrical configuration of the multifunction machine 40. The multifunction machine 50 has a main body 51, an image reader 52, an operation display unit 53 and the like and is provided with a copying function, a printing function, and a fax transmission/reception function.

The main body 51 has an image data storage unit 61, an image-processing unit 62, a sheet conveying unit 63, an image-forming unit 64, a communication I/F unit 65, and a control unit 66, wherein an image corresponding to image data is printed on a predetermined printing sheet (recording medium). Examples of the image data include image data of a document that is read by the image reader 52, print data transmitted from an external terminal device (not shown), and received facsimile data.

The image data storage unit 61 has a memory such as a flash memory. Under the control of the control unit 66, the image data storage unit 61 stores document image data that is output from the image reader 52, print data received from a client computer (not shown) by the communication I/F unit 65, and facsimile image data received from a public network (not shown) by the communication I/F unit 65. Under the control of the control unit 66, the image-processing unit 62 performs various image processes on the image data stored in the image data storage unit 61. For example, the image-processing unit 62 performs compression and expansion of the image data, calculation of the printing rates of the image data, and the like.

The sheet conveying unit 63 has a conveying roller, a motor for driving the conveying roller, and the like, conveys printing sheets stored in a sheet tray Tr1 to the image-forming unit 64, and conveys to a catch tray Tr2 the printing sheets on which image formation processes are performed by the image-forming unit 64. Under the control of the control unit 66, the image-forming unit 64 performs the image formation processes using the document image data, print image data, or facsimile image data stored in the image data storage unit 61. Specifically, the image-forming unit 64 forms a toner image corresponding to each of these image data, transfers the toner image to a printing sheet that is conveyed by the sheet conveying unit 63, and fixes the toner image using a fixing roller. The communication I/F unit 65 is connected to the client computer (not shown) or the public network (not shown) to transmit/receive various signals to/from the client computer or the public network.

The control unit 66 integrally controls the operations of the multifunction machine 50 in response to operation signals output from the operation display unit 53 or various instructions output from the communication I/F unit 65. For example, the control unit 66 controls the reading of the image data performed by the image reader 52, the reception of the image data performed by the communication I/F unit 65, the printing of the image data stored in the image data storage unit 61, and the like.

The image reader 52 has an ADF (Automatic Document Feeder), a document stand, a document-reading device, and the like. Under the control of the control unit 66 provided in the main body 51, the image reader 52 reads documents fed sequentially by the ADF or documents placed on the document stand, and then outputs the read image data to the control unit 66. The image data that are output to the control unit 66 are output to the image data storage unit 61.

Figure 5:
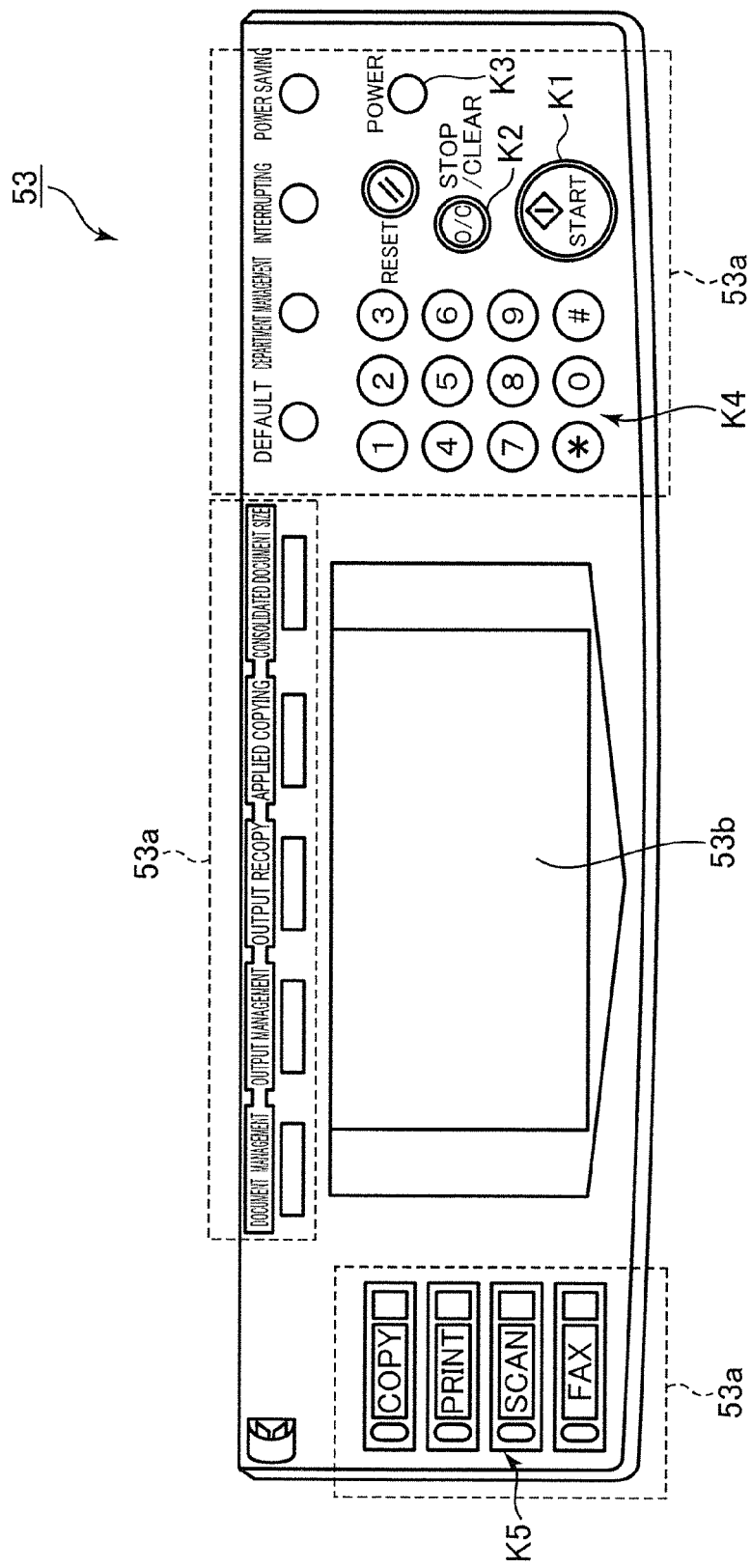
FIG. 5 is a plan view showing an operation display unit of the multifunction machine.

The operation display unit 53 outputs to the control unit 66 operation signals corresponding to user operations, and displays various information such as information on the state of the multifunction machine 50 (device state) under the control of the control unit 66. As shown in FIG. 4, the operation display unit 53 is provided with the lighting control circuit 1 described above. FIG. 5 is a plan view showing the operation display unit 53 of the multifunction machine 50. As shown in FIG. 5, the operation display unit 53 has an operation key unit 53a and a display unit 53b.

The operation key unit 53a has hard keys such as a start key K1, a stop/clear key K2, a power key K3, a numeric keypad (numeric input keys) K4, and a function switching keypad K5. Note that the function switching keypad K10 allows the user to switch the functions of the multifunction machine 50 between the operation modes of various functions when using the copying, printing, scanning, and facsimile functions realized by the multifunction machine 50. The display unit 53b has a touch panel function and displays a screen containing soft keys, under the control of the control unit 66.

The keys K1 to K5 provided in the operation key unit 53a have built-in light-emitting elements such as LEDs for displaying the state of the multifunction machine 50 (device state). The lighting and extinguishing the light-emitting elements are controlled by the lighting control circuit 1 provided in the operation display unit 53. For example, when the power of the multifunction machine 50 is ON, the light-emitting element embedded in the power key K3 is lighted, and one of the light-emitting elements embedded in the function switching keypad K5 is lighted in accordance with the condition of the operation performed by the user. It should be noted that the scanning signals S11 to S13 and S21 to S23 and the control signals C1 to C3 that are used in the lighting control circuit 1 are generated within the operation display unit 53 based on a control signal that is output from the control unit 66 to the operation display unit 53.

The above has described the lighting control circuit and image-forming device according to an embodiment of the present invention. However, the present invention is not limited to the foregoing embodiments and can be changed freely within the scope of the present invention. For example, the foregoing embodiment has described that the lighting control circuit 1 controls lighting and extinguishing the light-emitting elements individually by connecting the resistors to the cathode electrodes of the light-emitting elements and setting the potentials of the connection points between the cathode electrodes of the light-emitting elements and the resistors. Instead, the lighting and extinguishing the individual light-emitting elements may be controlled by connecting the resistors to the anode electrodes of the light-emitting elements and setting the potentials of the connection points between the anode electrodes of the light-emitting elements and the resistors.

The foregoing embodiment has also illustrate an example in which the lighting control circuit 1 controls lighting and extinguishing the light-emitting elements provided in the operation display unit 53 of the multifunction machine 1, but the lighting and extinguishing the light-emitting elements provided in the sections other than the operation display unit 53 may be controlled as well. Furthermore, the foregoing embodiment has also described that the light-emitting elements are LEDs, but the present invention is not limited to the LEDs and can be applied when controlling lighting and extinguishing LDs (Laser Diodes), for example.

In addition, the foregoing embodiment has described that the image forming apparatus according to the present invention is a multifunction machine; however, the present invention can be applied to an image forming apparatus such as a printer, a copy machine, and a facsimile machine.

The invention claimed is:

1. A lighting control circuit for controlling lighting and extinguishing a plurality of light-emitting elements, the lighting control circuit comprising:
   a first scanning circuit that sequentially scans the light-emitting elements by a predetermined first unit number at a time;
   a second scanning circuit that sequentially scans the light-emitting elements being scanned by the first scanning circuit by a second unit number, which is lower than the first unit number; and
   a control circuit that controls lighting and extinguishing the individual light-emitting elements being scanned by the first and second scanning circuits.

2. The lighting control circuit according to claim 1, wherein the first scanning circuit has a plurality of first switches that sequentially connect to a power source a plurality of scanning lines, to which the light-emitting elements are connected, by the first unit number at a time.

3. The lighting control circuit according to claim 2, wherein the second scanning circuit has, for each of the plurality of scanning lines, a plurality of second switches that sequentially connect to a ground the light-emitting elements to be scanned by the second unit number, out of the light-emitting elements to be scanned by the first unit number.

4. The lighting control circuit according to claim 3, further comprising:
   resistors that are connected to positive electrodes or negative electrodes of the light-emitting elements, wherein
   the control circuit has a plurality of third switches that set individual potentials of the positive electrodes or the negative electrodes of the light-emitting elements being scanned by the first and second scanning circuits.

5. The lighting control circuit according to claim 2, wherein a time during, which the first scanning circuit scans the light-emitting elements by the first unit number at a time, is set at a time obtained by multiplying a time, during which the second scanning circuit scans the light-emitting elements by the second unit number at a time, by the number of scanning lines.

6. The lighting control circuit according to claim 1, wherein a time, during which the control circuit controls lighting and extinguishing, is set at a time equivalent to a time, during which the second scanning circuit scans the light-emitting elements by the second unit number at a time.

7. An image forming apparatus for forming an image onto a recording medium, the image forming apparatus comprising:
   a plurality of light-emitting elements provided for displaying a device state; and
   the lighting control circuit of claim 1 that controls lighting and extinguishing the light-emitting elements.

* * * * *